US005915308A

United States Patent [19]

May et al.

[11] Patent Number: 5,915,308

[45] Date of Patent: Jun. 29, 1999

[54] DISCHARGE APPARATUS

[75] Inventors: Karl May, Bad Vilbel; Werner Axt; Eugen Schlag, both of Darmstadt; Heinz Sättler, Geroldheim; Klaus Busch, Darmstadt, all of Germany

[73] Assignee: Siemens Aktiengesellschaft, Munich, Germany

[21] Appl. No.: 09/119,308

[22] Filed: Jul. 20, 1998

Related U.S. Application Data

[63] Continuation of application No. PCT/DE97/00067, Jan. 16, 1997.

[30] Foreign Application Priority Data

Jan. 18, 1996 [DE] Germany .......................... 196 01 717

[51] Int. Cl.$^{6}$ ................................ F23J 1/00; B65G 25/00

[52] U.S. Cl. ...................... 110/165 R; 110/259; 110/229; 110/230; 414/147; 414/148; 414/150; 414/152; 414/156; 414/216

[58] Field of Search ............................... 110/165 R, 185, 110/226, 229, 230, 246, 259; 414/147, 148, 150, 152, 156, 216; 432/77, 78, 85

[56] References Cited

U.S. PATENT DOCUMENTS

| | | | |
|---|---|---|---|
| 2,367,063 | 1/1945 | Shallock . | |
| 3,455,445 | 7/1969 | Allen et al. . | |
| 4,503,783 | 3/1985 | Musschoot | 110/165 R |
| 4,831,940 | 5/1989 | Franza | 110/259 |

FOREIGN PATENT DOCUMENTS

| | | | |
|---|---|---|---|
| 552253 | 11/1956 | Belgium | 110/165 R |
| 0 086 488 A2 | 8/1983 | European Pat. Off. . | |
| 0 210 658 A1 | 2/1987 | European Pat. Off. . | |
| 7047879 | 11/1973 | Germany . | |
| 30 05 205 A1 | 8/1981 | Germany . | |
| 40 05 653 A1 | 8/1991 | Germany . | |
| 6-82025 | 3/1994 | Japan | 110/165 R |
| 2 143 310 | 2/1985 | United Kingdom . | |

OTHER PUBLICATIONS

Published International Application WO87/04087 (Forslund), dated Jul. 16, 1987.

Published International Application WO81/02302 (Hillekamp), dated Aug. 20, 1981.

*Primary Examiner*—Ira S. Lazarus
*Assistant Examiner*—Ljiljana V. Ciric
*Attorney, Agent, or Firm*—Herbert L. Lerner; Laurence A. Greenberg

[57] ABSTRACT

A discharge apparatus includes a housing into which a discharge pipe of a carbonization drum opens. A residue discharge chute which starts from the housing opens into a conveying device ending at an outlet. A filling-level meter is disposed at the residue discharge chute. The conveying device has a profiled separating shelf with an end remote from the mouth of the residue discharge chute, at which a bar screen is formed. The bar screen covers a delivery opening for fine residue and ends at the outlet for coarse residue. A vibrator is associated with the conveying device.

8 Claims, 2 Drawing Sheets

DISCHARGE APPARATUS

CROSS-REFERENCE TO RELATED APPLICATION

This application is a continuation of copending International Application No. PCT/DE97/00067, filed on Jan. 16, 1997, which designated the United States.

BACKGROUND OF THE INVENTION

Field of the Invention

The invention relates to a discharge apparatus having a housing into which a discharge pipe of a carbonization drum opens and from which a residue discharge chute starts, the residue discharge chute opens into a conveying device ending at an outlet, and a filling-level meter is disposed at the residue discharge chute.

Such a discharge apparatus is known from German Published, Non-Prosecuted Patent Application DE 30 05 205 A1. The discharge apparatus is shown therein for a pyrolysis plant and is distinguished by the fact that during operation a discharge container is constantly filled with carbonization residue in order to form a gas-tight closure. A filling-level meter monitors the filling level in the container. The carbonization residue is transported away at the outlet of the container by a conveying device and taken to an outlet.

The conveying device only constantly transports away so much residue as to ensure that the filling level in the housing does not drop below the position of the filling-level meter.

Separation of the residue into fine and coarse constituents is not provided in the prior art.

Such a separating apparatus is known from Published European Patent Application 0 086 488 A3. In that case, a bar screen is provided for that purpose and a vibrator is associated therewith. The carbonization residue to be segregated drops onto the bar screen. An outlet for fine residue is located below the bar screen and there is an outlet for coarse residue at the end of the bar screen.

Since residue constantly drops onto the bar screen, the coarse residue is contaminated with fine residue when it reaches the outlet for the coarse residue. The residence time on the bar screen is not sufficient for the fine residue to be shaken off the coarse residue by the vibrations of the bar screen because new fine residue is constantly dropping onto the coarse residue.

SUMMARY OF THE INVENTION

It is accordingly an object of the invention to provide a discharge apparatus, which overcomes the hereinafore-mentioned disadvantages of the heretofore-known devices of this general type, which has a gas-tight closure and which is complemented by a separating apparatus that separates coarse residue from fine residue and, in the process, cleans the coarse residue to remove adhering particles of the fine residue.

With the foregoing and other objects in view there is provided, in accordance with the invention, a discharge apparatus, comprising a housing; a carbonization drum having a discharge pipe opening into the housing; a residue discharge chute starting from the housing and having a mouth; a filling-level meter disposed at the residue discharge chute; a conveying device into which the residue discharge chute opens, the conveying device having a profiled separating shelf with an end facing away from the mouth of the residue discharge chute, a delivery opening for fine residue, an outlet at the end for coarse residue, and a bar screen formed at the end of the profiled separating shelf, covering the delivery opening and ending at the outlet; and a vibrator associated with the conveying device.

This discharge apparatus achieves the advantage of shaking the fine residue off the coarse residue on the separating shelf which is caused to vibrate by the vibrator without any further fine residue being able to drop onto the coarse residue. While the coarse residue rests on the raised points or crests of the profile, the fine residue collects in the valleys or hollows of the profile. When the residue reaches the formed-on bar screen, the coarse residue has been cleaned. The fine residue then drops through the bar screen into the delivery opening for fine residue, and the cleaned coarse residue is transported further over the bar screen due to the vibration of the conveying device and drops into the outlet for coarse residue.

Further apparatuses or containers may be connected to the delivery opening and to the outlet. Such a container does not need to be attached in a gas-tight manner since there is always a seal made by the carbonization residue in the residue discharge chute.

In accordance with another feature of the invention, the residue discharge chute is curved towards the conveying direction before it opens into the conveying device. It is thus guaranteed that the residue always slides from the residue discharge chute to the conveying device.

In accordance with a further feature of the invention, the residue discharge chute is sealed off from the conveying device by a flexible compensator. This provides a seal between these two components which withstands the movements of the conveying device relative to the residue discharge chute.

In accordance with an added feature of the invention, the profiled separating shelf is formed of a profiled metal sheet or of a profiled casting. For example, the separating shelf may have a sawtooth-shaped cross-section.

In accordance with an additional feature of the invention, the separating shelf has curved cutouts at a transition to the bar screen. As a result, this advantageously prevents coarse residue which may be in the form of wire wool from becoming stuck at the end of the separating shelf.

In accordance with yet another feature of the invention, there are provided separating walls without edges disposed between the delivery opening for fine residue and the outlet for coarse residue. This also achieves the advantage of ensuring that no wire wool can become stuck.

In accordance with a concomitant feature of the invention, there are provided two separately controllable vibrators associated with the conveying device. For example, the rotational speed of the two vibrators may differ.

An advantage which is also achieved with the discharge apparatus according to the invention is that by using a conveying device fitted with a vibrator, a plug of carbonization residue is sealed in the residue discharge chute so as to provide a better possibility of preventing atmospheric oxygen from entering the carbonization apparatus than was previously the case. In particular, an advantage which is achieved is that the separation of coarse residue from fine residue is significantly better than was previously possible.

The combination of a profiled separating shelf and a bar screen as described can also be used for the separation or cleaning of other materials.

Other features which are considered as characteristic for the invention are set forth in the appended claims.

Although the invention is illustrated and described herein as embodied in a discharge apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
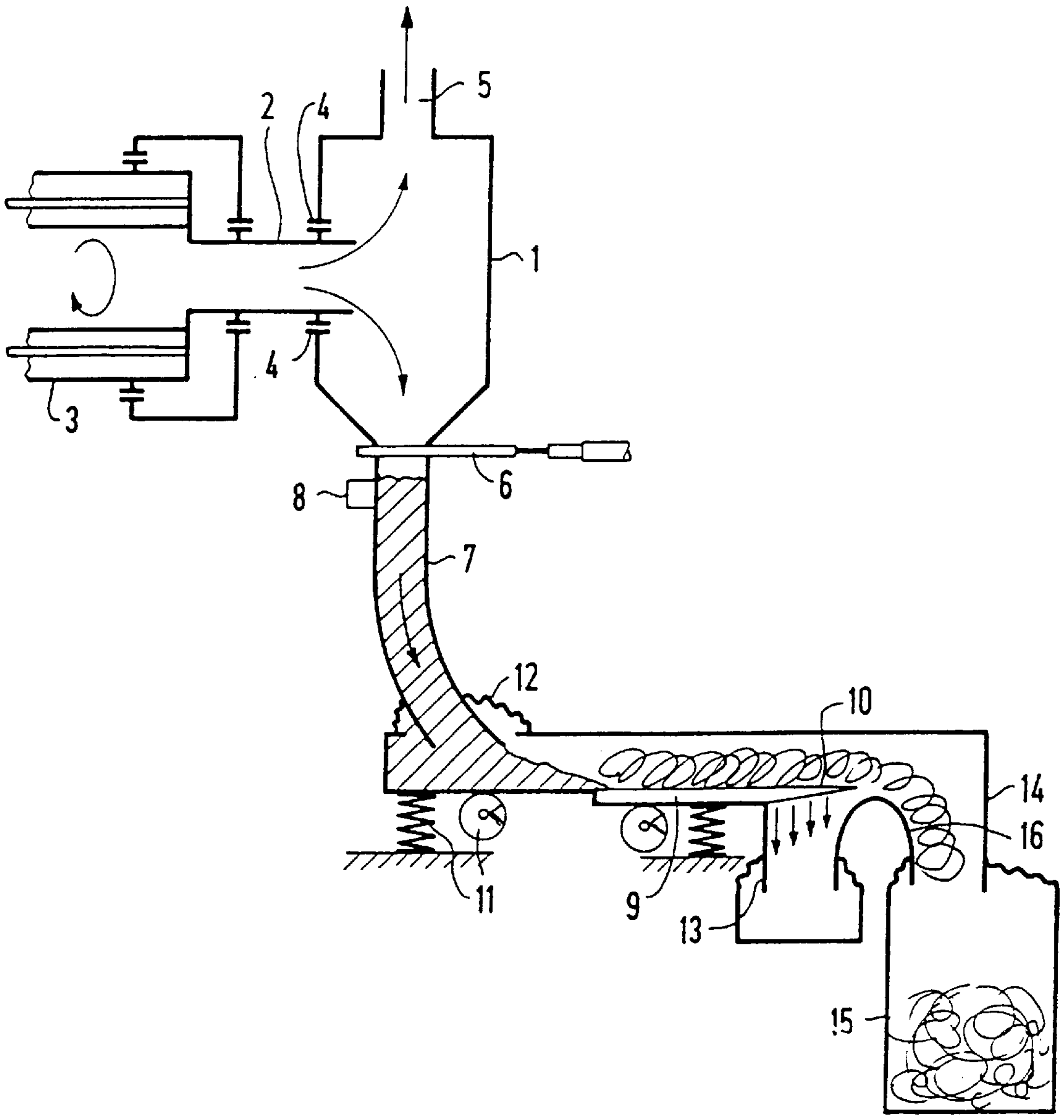
FIG. 1 is a fragmentary, diagrammatic, partly broken-away and section view of a discharge apparatus according to the invention.

Referring now to the figures of the drawings in detail and first, particularly, to FIG. 1 thereof, there is seen a housing 1 of a discharge apparatus. Waste material is carbonized in the carbonization drum 3 and a rotatable discharge pipe 2 of the carbonization drum 3 opens into the housing 1. Carbonization gas and carbonization residue which are produced in the process of carbonization pass through the discharge pipe 2 into the housing 1. The rotatable discharge pipe 2 is sealed off from the housing 1 for this purpose through the use of seals 4. The carbonization gas leaves the housing 1 through a delivery opening 5 which is disposed in a top part of the housing 1. The delivery opening 5 is gas-tightly connected to a non-illustrated apparatus for further treatment of the carbonization gas, e.g. using a high-temperature combustion chamber. The solid carbonization residue drops to the bottom in the housing 1. A residue discharge chute 7 starts from a bottom outlet of the housing 1, which may be closed by an emergency slide 6. The residue discharge chute opens into a conveying device and is curved towards a transporting direction of the conveying device just before it discharges. A filling-level meter 8 is disposed on a top section of the residue discharge chute 7. The conveying device is controlled in such a way that a dense pile of carbonization residue is always present in the residue discharge chute 7. The pile prevents gases, in particular atmospheric oxygen, from flowing back into the carbonization drum 3.

The conveying device is formed of a profiled separating shelf 9 which is located near the mouth of the residue discharge chute 7, a bar screen 10 which is formed on the separating shelf 9 in the transporting direction, and a vibrator 11. The latter may include springs for supporting the conveying device and eccentric rollers which are driven by a non-illustrated motor. The residue discharge chute 7 is sealed off relative to the conveying device by a flexible compensator 12. The vibrator 11 may be controllable. It can thus be ensured that the residue discharge chute 7 is always closed by the residue in a gas-tight manner. Coarse and fine residues are separated from one another on the separating shelf 9 and are moved forwards at the same time through the use of the vibration of the conveying device. The fine residues then drop through the bar screen 10 and pass into a delivery opening 13 for fine residue which is disposed there. This delivery opening 13 may open into a container, or even into an apparatus for further treatment, e.g. a high-temperature combustion chamber. The coarse residue is transported over the bar screen 10 to its end, from where it drops into an outlet 14 for coarse residue which is disposed there. A container 15 may be connected to this outlet 14. Separating walls 16 that are without edges and to which no residue adheres, are disposed between the delivery opening 13 and the outlet 14.

Figure 2:
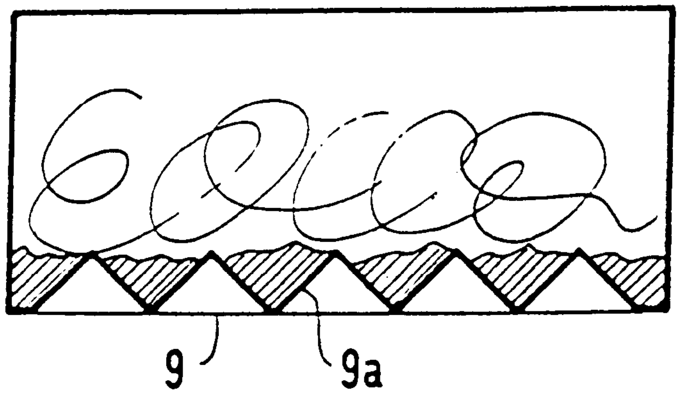
FIG. 2 is a cross-section view of a profiled separating shelf.

FIG. 2 shows a cross-section through a separating shelf 9 which has a sawtooth-shaped profile 9*a*. The fine residue collects in valleys or hollows of this profile 9*a*, while the coarse residue lies on peaks of the profile 9*a*. Fine residue adhering to the coarse residue is shaken off due to the vibration movement of the separating shelf 9, so that a coarse residue remains which is as clean as possible.

Figure 3:
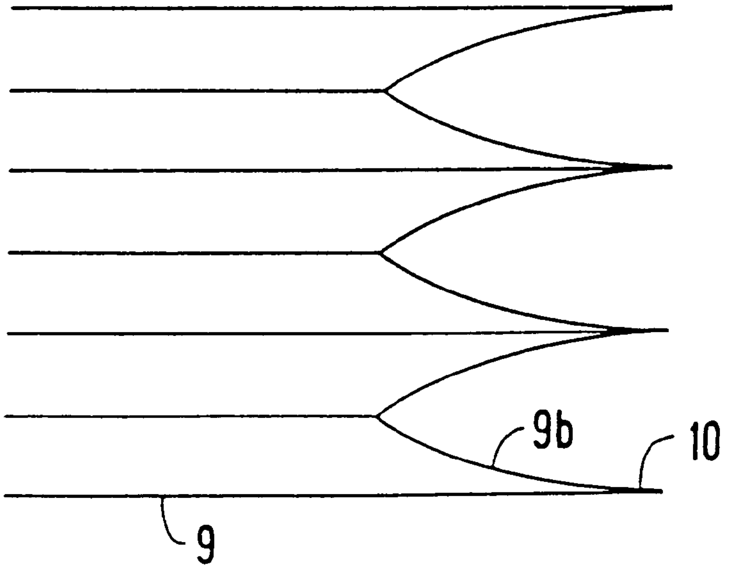
FIG. 3 is a plan view of a profiled separating shelf on which a bar screen is formed.

FIG. 3 shows a transition of the separating shelf 9 to the bar screen 10. The separating shelf 9 has curved cutouts 9*b* in this transition region. This prevents coarse residue, e.g. wire wool, from adhering to the end of the separating shelf 9.

Through the use of the discharge apparatus according to the invention, on one hand atmospheric oxygen is prevented from flowing back into the carbonization drum 3 and, on the other hand, the coarse residue is almost completely separated from the fine residue. While the fine residue is usually subjected to further treatment, the coarse residue is formed of metal and pieces of glass which may serve directly as raw materials.

We claim:

1. A discharge apparatus, comprising:

a housing;

a carbonization drum having a discharge pipe opening into said housing;

a residue discharge chute starting from said housing and having a mouth;

a filling-level meter disposed at said residue discharge chute;

a conveying device into which said residue discharge chute opens, said conveying device having a profiled separating shelf with an end facing away from said mouth of said residue discharge chute, a delivery opening for fine residue, an outlet for coarse residue, and a screen formed at said end of said profiled separating shelf, said screen covering said delivery opening and ending at said outlet; and a vibrator associated with said conveying device.

2. The discharge apparatus according to claim 1, wherein said residue discharge chute is curved towards a conveying direction before opening into said conveying device.

3. The discharge apparatus according to claim 1, including a flexible compensator sealing off said residue discharge chute relative to said conveying device.

4. The discharge apparatus according to claim 1, wherein said profiled separating shelf is formed of profiled sheet metal.

5. The discharge apparatus according to claim 1, wherein said profiled separating shelf is formed of a profiled casting.

6. The discharge apparatus according to claim 1, wherein said separating shelf has curved cutouts at a transition to said screen.

7. The discharge apparatus according to claim 1, including separating walls without edges along along a residue transport surface, said separating walls disposed between said delivery opening and said outlet.

8. The discharge apparatus according to claim 1, including another vibrator associated with said conveying device, said vibrators separately controllable.

* * * * *